June 26, 1962     W. G. HOKETT     3,040,618
TURBINE DRIVEN CAMERA IN A SPACE SHIP
Filed April 13, 1959
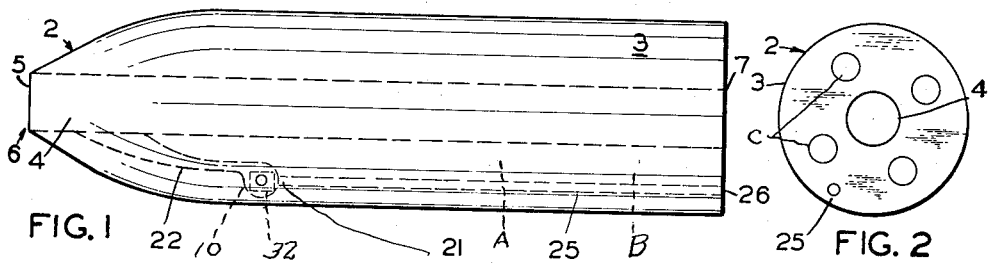
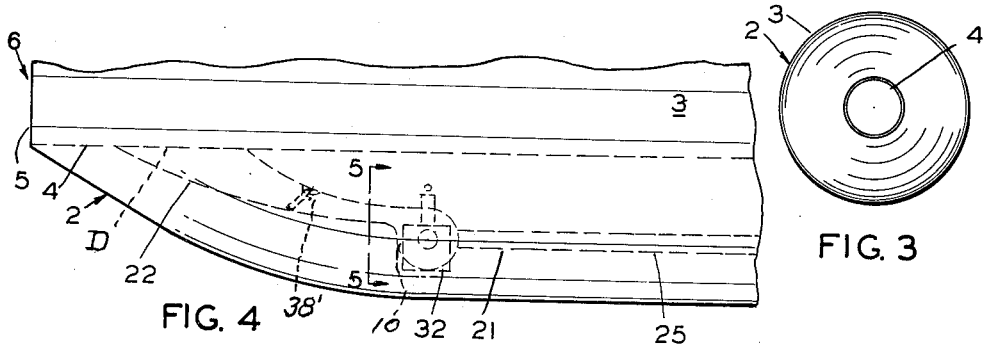
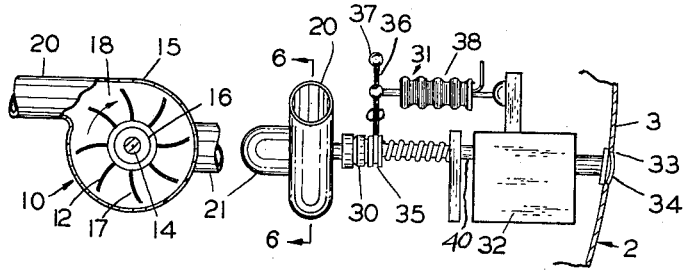
INVENTOR.
William G. Hokett
BY Scott L. Norviel
atty.

United States Patent Office 3,040,618
Patented June 26, 1962

3,040,618
TURBINE DRIVEN CAMERA IN A SPACE SHIP
William G. Hokett, 2322 N. 9th St., Phoenix, Ariz.
Filed Apr. 13, 1959, Ser. No. 806,121
1 Claim. (Cl. 88—16)

This invention pertains to photographic devices for space ships or flying missiles.

More particularly the invention pertains to mechanism for driving a motion picture camera in a missile traveling in the space above the atmosphere of the earth.

One of the objects of the invention is to provide, within a missile, a means for inducting a flow of gases, however rarefied they may be, through ducts or channels within the missile causing these gases to rotate mechanism, including a motion picture camera, within the body of the missile, and then discharging the gases from the missile in a direction opposite to that of its movement;

Another object is to provide ducts within a missile connecting openings disposed in parts of the missile positioned on its forward faces, or surfaces on the ends of the missile body positioned in the direction of movement, with the inlet of a case of a turbine wheel, and ducts connecting the outlet of the case of the turbine with openings in the aft part of the turbine body, and to provide the drive mechanism of a motion picture camera disposed within the body of the missile with a power transmission and control mechanism connecting it to said turbine;

Still another object is to provide a missile having a body shape adapted to afford gas pressure differential which can be applied through ducts to the operation of a turbine wheel which is operatively connected to a motion picture camera.

Other objects will appear hereinafter.

I attain the foregoing objects by means of the devices, parts, and combinations of parts illustrated in the accompanying drawing wherein—

FIGURE 1 is a side elevation of a missile equipped with a gas driven turbine and a motion picture camera incorporating my invention; with interior parts shown by dashed lines;

FIGURE 2 is a front end view thereof;

FIGURE 3 is a rear elevational view of the missile;

FIGURE 4 is a view of a portion of the missile hull, shown in FIGURE 1, indicating the motion picture camera and drive mechanism within the missile body by dashed lines, and drawn on an enlarged scale;

FIGURE 5 is a mid-sectional elevation of a turbine, and camera here concerned, taken on line 5—5, FIGURE 4; and FIGURE 6 is an elevation of the turbine as viewed from line 6—6, FIGURE 5.

Similar numerals refer to similar parts in the several views.

Whereas, in years past, outer space, that is, the space beyond the earth's atmosphere, was thought to be utterly devoid of substances of any kind whatsoever, recent discoveries lead us to believe that outer space does contain particles of matter and that the difference between outer space and the earth's atmosphere is a difference in the degree of the compacting of particles. In view of this it can be understood that while a missile body moving through the earth's atmosphere at a comparatively slow speed encounters many particles (molecules and atoms of gases) in a given time, the missile traveling through outer space at a much greater speed would in the course of its movement encounter many particles, and the greater the speed the greater the distance traveled in a given time and therefore the greater the number of particles encountered. The density of particles in outer space is not uniform, and therefore, where the density is sufficient a properly designed mechanical device, such as a turbine, can be made to operate by contact with the particles present and made to do useful work. The work to be done, in the present case, is to operate a motion picture camera so that a photographic record can be made of the conditions and objects which might be visible from the missile.

In the drawings, 2 indicates a space ship having a missile shaped body with an outer hull 3 and an axially extending tube 4. The front end 5 of the tube opens in the nose 6 of the hull 3 and relieves the build-up of gas pressure at the front end of the hull. The gases directly encountered pass through the tube and out the rear end 7 rather than being displaced and forced radially outward. This construction reduces head resistance. An annularly shaped interior A is thus provided for the hull. The rear of interior space B is reserved for propulsive devices C.

Within the interior of the missile, and forward of the space B, I provide as gas operated turbine 10 which has a rotor 12 operating on shaft 14 within case 15. The hub 16 of the rotor 12 has a number of radially extending fins 17 which are curved slightly in a direction opposite to the direction of rotation, as indicated by arrow 18.

The case 15 has a tangential inlet tube 20, the axis of which is aligned generally with the center of the faces of fins 17. On one side there is a centrally or axially disposed exhaust or outlet pipe 21 which opens into a case 15 adjacent to rotor hub 16.

Inlet tube 20 is connected to duct 22 which extends forward in the missile body and opens at D into the forward end portion of tube 4, where there is a pressure build-up. Optionally this inlet duct may open to any high pressure area on the hull 3. The outlet tube 21 from the turbine case is connected to an outlet duct 25 which exits at the rear 26 of the missile hull 3 where pressure is diminished.

The shaft 14 extends outward from the turbine 10, and, as here arranged, extends radially of hull 3, and through clutch 30 and clutch release mechanism 31 to the operative shaft of the mechanism of a motion picture camera 32.

This camera is of conventional construction (details not shown) and has its lens (tube 34) directed through a transparent seal plate 33 in the adjacent wall of hull 3. Mechanism for advancing light sensitive film through the camera is of conventional construction and is driven by a shaft 40.

The throwout mechanism of the clutch 30 includes the yoke parts 35 and a release lever 36 which may be manually operated by handle 37 or automatically operated by pressure responsive devices 38.

Obviously time or radio controlled devices could be substituted for control 38.

In use the missile is set in motion and directed toward outer space. To prevent excessive operational speeds as the missile passes through the atmosphere valve 38′ may be closed. This may be opened manually by a person aboard the missile when space conditions are reached. Otherwise this valve may be opened by pressure responsive devices similar to 38.

When the desired altitude is reached the turbine 10 is operated continuously. When pictures are to be taken the clutch connects the turbine to the camera mechanism. Whereas the camera is shown with its lens 34 directed out of the side of the missile hull 3, it is to be understood that the camera lens may be directed in any direction desired.

It is to be understood that the foregoing words and expressions are intended as descriptive and not as words and expressions of limitation.

I claim:

In a space ship having an elongated body with a round outer hull and a tube extending axially through said body, a gas flow driven turbine within said hull, an elongated tangential inlet pipe, said inlet pipe communicating with said turbine and extending longitudinally along said body toward the forward end of the space vehicle, said inlet pipe having a tangential inlet opening at its forward end, an elongated outlet pipe communicating with said turbine and extending lengthwise of said body toward the rear of the space vehicle, said outlet pipe having an outlet opening at the rear of the vehicle, a radially bladed turbine rotor in said turbine adapted to rotate in response to high pressure gases received through the inlet opening during the forward motion of the space vehicle, said outlet opening providing a low pressure outlet for said gases, a motion picture camera, disposed within said hull, having mechanism for advancing light sensitive film behind a lens, and a lens directed outward from said body hull, said turbine rotor having a shaft rotatable with said rotor and a clutch mechanism connecting the shaft of said turbine with the mechanism of said motion picture camera for operating said camera in response to the rotation of said turbine shaft.

References Cited in the file of this patent

UNITED STATES PATENTS

| | | |
|---|---|---|
| 1,939,665 | Crew | Dec. 19, 1933 |
| 1,940,434 | Nistri | Dec. 19, 1933 |
| 2,378,182 | Burrell | June 12, 1945 |
| 2,457,236 | Hokett | Dec. 28, 1948 |